United States Patent [19]

Gerry

[11] 4,176,647
[45] Dec. 4, 1979

[54] MODULATION IGNITION SYSTEM

[76] Inventor: Martin E. Gerry, 13452 Winthrope St., Santa Ana, Calif. 92705

[21] Appl. No.: 812,912

[22] Filed: Jul. 5, 1977

[51] Int. Cl.² .......................... F02P 3/04; H05B 41/14
[52] U.S. Cl. ........................ 123/148 E; 123/148 AC; 123/148 B; 315/209 R
[58] Field of Search ................. 123/148 DC, 148 AC, 123/148 E, 179 BG; 128/148 B, 148 DS; 315/176, 172, 209 M, 209 R

[56] References Cited

U.S. PATENT DOCUMENTS

| | | | |
|---|---|---|---|
| 2,227,714 | 1/1941 | Holthonse et al. | 315/172 |
| 2,712,814 | 7/1955 | Harr | 123/148 B |
| 2,883,560 | 4/1959 | Knudson | 123/148 B |
| 2,898,392 | 8/1959 | Jaeschke | 123/148 E |
| 2,940,013 | 6/1960 | Cook | 123/148 B |
| 3,170,451 | 2/1965 | Fortier | 123/179 BG |
| 3,452,731 | 7/1969 | Becker | 123/148 E |
| 3,504,154 | 3/1970 | Marcolini | 315/176 |
| 3,510,702 | 5/1970 | Gerry | 123/148 AC |
| 3,518,978 | 7/1970 | Schmiedel | 123/148 CC |
| 3,543,740 | 12/1970 | Vienat | 123/179 BG |
| 3,780,717 | 12/1973 | Rakitch | 123/148 AC |
| 3,972,315 | 8/1976 | Munden et al. | 123/148 E |
| 4,015,576 | 4/1977 | Junak | 123/148 E |
| 4,033,316 | 7/1977 | Birchenough | 123/148 E |
| 4,041,922 | 8/1977 | Abe et al. | 123/148 E |
| 4,074,665 | 2/1978 | Patis | 123/148 E |
| 4,139,804 | 2/1979 | Gerry | 315/209 R |

Primary Examiner—Charles J. Myhre
Assistant Examiner—P. S. Lall

[57] ABSTRACT

A Kettering type ignition system is improved by modulating the transient output from such system with an AC component signal to substantially increase the energy delivered to the igniters. The system provides for impedance matching of the AC source to the impedance of the ignition transformer. Ignition transformers with single and multiple primary windings are utilized.

9 Claims, 17 Drawing Figures

FIG. 14 i(t) = primary current
V = 12, battery voltage
L = 6.7×10⁻³ henries, primary inductance
R = 1.4 ohms, primary resistance
C = 0.1 microfarads, capacitor
G = contactors or points
H = engine driven cam actuating points

$$i(t) = e^{-\frac{R}{2L}t}\left\{0.0395 \sin\frac{t}{\sqrt{LC}} + 2.53 \cos\frac{t}{\sqrt{LC}}\right\} \quad (1)$$

$$\cong 2.53\, e^{-\frac{R}{2L}t} \cos\frac{t}{\sqrt{LC}} \quad (2)$$

$$e(t) = -L\frac{di}{dt} \quad (3)$$

$$= 1.7\times10^{-2} e^{-\frac{R}{2L}t}\left\{\frac{1}{\sqrt{LC}}\sin\frac{t}{\sqrt{LC}} + \frac{R}{2L}\cos\frac{t}{\sqrt{LC}}\right\} \quad (4)$$

$$\cong \frac{1.7\times10^{-2}}{\sqrt{LC}} e^{-\frac{R}{2L}t} \sin\frac{t}{\sqrt{LC}} \cong 656\, e^{-104t} \sin 38.6\times10^{3}t \quad (5)$$

$$P_1 = \text{power in primary} = i(t)\,e(t) \quad (6)$$

$$\cong 2.24\, e^{-209t} \cos 7.36\times10^{4}t + 791.4\, e^{-209t} \sin 7.36\times10^{4}t \quad (7)$$

$$\mathcal{E}_1 = \text{energy in primary} = \int_{t=0}^{t=0.833\times10^{-3}} P_1\,dt = 1.04\times10^{-2} \text{ watt-seconds} \quad (8)$$

$$\mathcal{E}_2 = \text{secondary firing energy} = \eta\,\mathcal{E}_1 = 0.9\times1.04\times10^{-2} = 0.936\times10^{-2} \text{ watt-sec.} \quad (9)$$

$$P_2 = \text{power in secondary} = \frac{\mathcal{E}_2}{t} = \frac{0.936\times10^{-2}}{0.833\times10^{-3}} = 11 \text{ watts} \quad (10)$$

$$v = \text{rectangular wave voltage FIG. 15} = V_0\left[u(t) + 2\sum_{n=1}^{\infty}(-1)^n u(t-2nk)\right] \quad (11)$$

$$E_{mod} = \text{intermodulation of Kettering \& Rectangular wave voltages}$$

$$= [v+e(t)] + \frac{[v+e(t)]^2}{2!} + \frac{[v+e(t)]^3}{3!} + \cdots \quad (12)$$

MODULATION IGNITION SYSTEM

INCORPORATION BY REFERENCE

U.S. application Ser. No. 756,547 filed Jan. 3, 1977 is incorporated by reference herein as though fully set forth for the purpose of showing the magnitude of arcs that can be obtained on firing of igniters.

BACKGROUND OF THE INVENTION

This invention is in the field of ignition systems and more particularly in such systems that utilize both DC and AC power.

No art exists in the area of ignition systems employing the principles of Kettering systems and AC sources to modulate the transient output of the Kettering systems.

SUMMARY OF THE INVENTION

It is therefore an objective of this invention to provide a system that uses the principles of the Kettering system and modulate the transient output thereof with AC such as square waves and the like, to produce a high energy ignition system that operates at reasonable voltages but delivers substantially higher current to the spark plugs or igniters over greater periods of firing time than the Kettering system is capable of delivering.

Accordingly, an ignition system is provided having first means intermittently fed by DC power for producing transient power during operative mode of such system, and second means for providing AC power, for intermodulating the AC and transient power during such operative mode.

Reactive means in circuit with the first and second means is provided for matching the impedance of the first means to the impedance of the second means during such operative mode.

In one instance, the first means constitutes the reactive means which substantially matches the impedance of the second means, and in another instance the second means constitutes the reactive means substantially matching the impedance of the first means during such operative mode.

The invention includes means in circuit with the first means for intermittently short circuiting same during such operative mode. Such invention also includes means in circuit with the reactive means for intermittently short circuiting the reactive means during such operative mode.

The Kettering system at the same time as providing transient power during its operative mode, also includes a power source in circuit with the typical Kettering circuit, which power source provides an output to the system the amplitude of which varies as a function of time, such output modulates the transient power.

The reactive means has a transformer in circuit therewith, such reactive means also constitutes an impedance matching means that matches the impedance of the power source to the impedance of the transformer during such operative mode.

Switching means are provided connected either to the impedance matching means or to a primary winding of the transformer, intermittently short circuiting either the impedance matching means or the primary winding. Such switching means may consist either of a cam driven contactor pair or pairs, a disk driven light switch device or a magnetic pulse switch.

The transformer may be either of single primary winding or have a plural number of primary windings so that the Kettering portion of the circuit and the AC source may have separate feeds into the transformer.

Thus the system intermittently interrupts DC power feeding a transformer and produces transient power, and the transient power is modulated with AC power. The AC power is passed through reactive means thereby matching the impedance of the transformer with the impedance of the AC source to obtain optimum power transfer from the AC source to the transformer, and in operation the reactive means or the transformer primary is intermittently short circuited during the dwell time of the system.

DETAILED DESCRIPTION

Referring to FIGS. 1–8, detailed versions of a Kettering type system, each intermodulated with AC, make possible the delivery of high energy levels to the igniters resulting in multiple arc firings thereof over substantially long firing periods.

Throughout the specification, signal return 15 is shown as a conventional ground symbol, such also being the negative potential terminal of battery 11. Hence return 15 will not be referred to hereinbelow.

Referring to FIGS. 1, 11, 12 and 13, an AC power source is provided at 10 which has a coupling transformer the output winding 14 of which is fed by battery 11 through ignition switch 12. The other side of winding 14 is connected by means of wire 16 to a terminal common to primary and secondary windings of ignition transformer 20, the other side of primary winding 21 being connected in series with capacitor 25 to ground. A pair of contactors consists of contactor 26 connected at A and contactor 27 connected to ground, so that such contactors electrically shunt capacitor 25 when the high portions of cam 28 cooperate with contactor 27. Cam 28 is mounted on distributor shaft 13 which also drives rotor 31 of distributor 30. Secondary winding 22 of ignition transformer 20 is electrically connected by means of high tension wire 29 to rotor 31. A conventional four cylinder distributor at 30 has stationary members 32 equally spaced about its inner periphery to which are connected spark plugs or igniters 40, so that the arc-over between rotor 31 and each member 32 provides the high voltage to each igniter as distributor rotor 31 is driven by shaft 13.

The schematic of the rectangular waveform generator 10 is shown in Arnold Engineering Company Bulletin IC-101B, copyright 1972, pages 45 and 46 thereof. The generator is referred to in such bulletin as the Royer Oscillator, shown as such as FIG. 22 therein. Generator 10 of this specification utilized this circuit except for deletion of diodes $D_1$ and $D_2$. Such diodes in the Royer Oscillator are used to suppress transient spikes, and such transient spikes are desireable in ignition systems as they increase the voltage output.

It may be seen that removing, by short circuiting, winding 14 would result in a typical Kettering type system. However, the presence of winding 14 in circuit with primary winding 21 permits the AC power output from source 10, usually square waves of a repetition rate between 2 and 10 kilohertz, to intermodulate with the waveform produced by the Kettering system portion (see FIGS. 11 or 12) to produce the modulated waveform (see FIG. 13). The waveform at FIG. 11 was computed approximating the graphing of ringing frequencies subsequent to the first ring frequency shown, otherwise it would be substantially identical with that shown in FIG. 12 when its time base is compressed to that shown in FIG. 12. Notably, the intermodulation of the Kettering waveform with the square wave waveform of the AC portion produces waveform burst periods which have greater amplitudes due to the presence of cross-modulation components which result in greater energy delivered for longer periods of time to the igniters. Additionally, the results include multiple arcs across the igniter electrodes, as depicted in the incorporated reference application, instead of one arc, and it has been found that igniter electrodes may exclude the use of a base extension member normally bent over to form a gap with the center electrode, to result in multiple arcs of about 0.250 inches each, which obviously provide greater ignition energy than the conventional Kettering or similar system.

Figure 1:
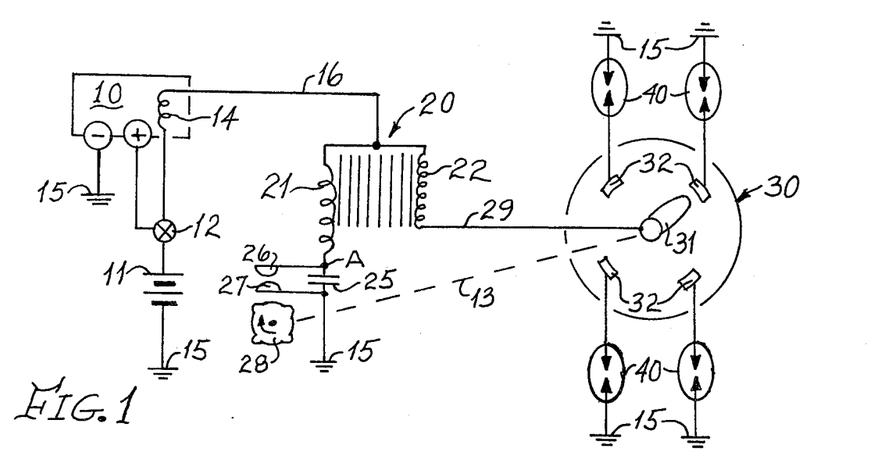
FIG. 1 is a schematic diagram of the system according to the invention.

Of special consideration, is the value of capacitor 25 which must be chosen to provide an impedance match for optimum power transfer between source 10 and ignition transformer 20. This is accomplished by inserting a one-ohm resistor in line 16 and measuring the voltage thereacross during firing mode, preferably with a calibrated oscilloscope. The voltage across the one-ohm resitor will be the current therethrough by Ohm's law, and different values of capacitors are tried until the maximum voltage is read across the one-ohm resistor. In this instance, capacitor 25 was selected at 0.5 microfarads at 400 volt rating. Care should be taken to chose a capacitor which can handle the substantially higher power delivered to primary 21 due to impedance match, and the increased current resulting through capacitor 25. Usually, a paper or oil-filled industrial capacitor will suffice.

Figure 12:
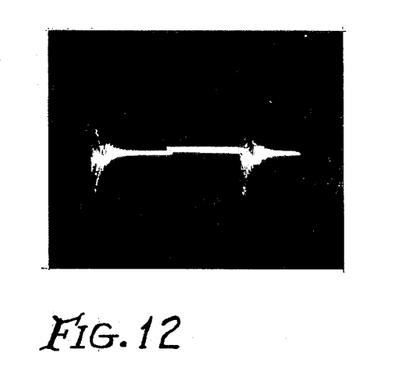
FIG. 12 is a photograph taken from the face of an oscilloscope of the voltage across the transformer primary winding during igniter firing in a Kettering system.

It should be noted that if a switch were inserted in series with the plus terminal of source 10 and igniter switch 12 and in open mode, no power would be provided to source 10 and the circuit would be a typical Kettering circuit providing a votage waveform as in FIG. 12, except that capacitor 25 value is higher here than normally used in a Kettering system, and that winding 14 would be in series circuit with ignition transformer 20.

Figure 11:
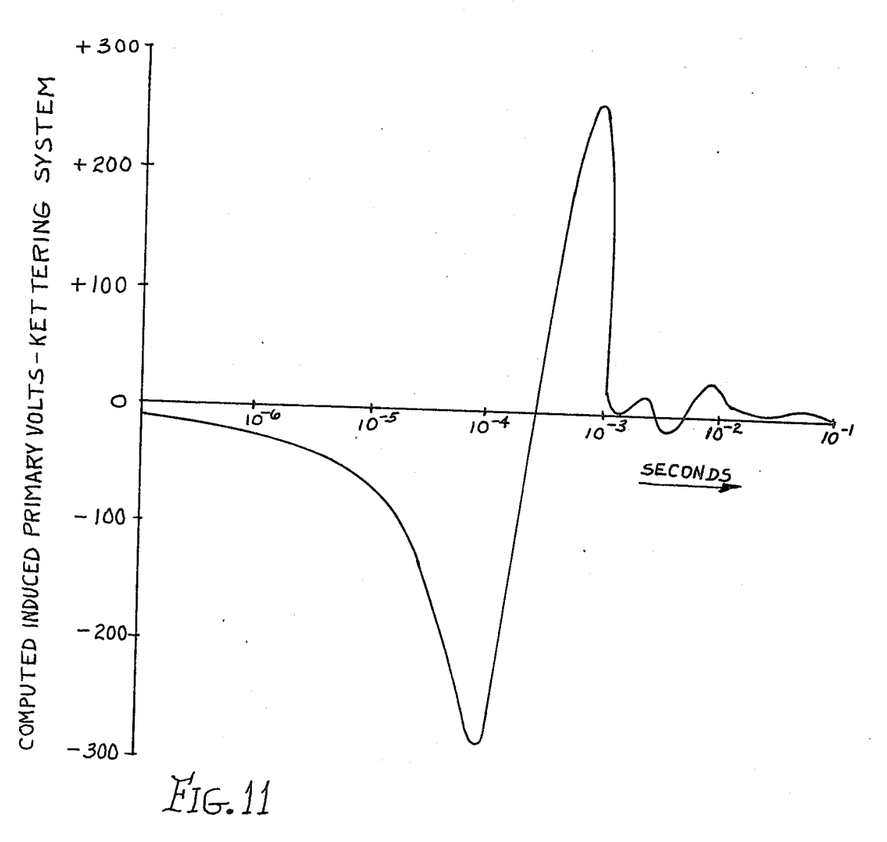
FIG. 11 is a computed graph of the transient voltage obtained in a Kettering system as induced in the transformer primary winding.

It should also be noted, that in operation of the Kettering portion of the system, primary winding 21 is first charged during the conventional dwell period, say 30° in an eight cylinder system and 60° in a four cylinder system, during which time contactors 26 and 27 are closed by operation of cam 28 and capacitor 25 is short circuited. At the proper ignition firing time cam 28 acts to open contacts 26–27 thus allowing a transient current to be developed through capacitor 25, and a voltage waveform as shown in FIG. 11 or 12. However, at the same time that primary winding 21 is charged, winding 14 is also charged by battery 11 and therefore initial conditions exist in windings 14 and 21 at time of firing of igniters. Noting that capacitor 25 has a dual purpose of acting in its usual Kettering mode as well as acting as an impedance matching means to match the impedance of circuit 10 output with transformer 20 input during igniter firing mode, it can be seen that during discharge or firing period of the Kettering mode, there will also be added a maximum AC power input to primary 21 thus intermodulating the Kettering waveform power level with the waveform power level of source 10, to result in the patterns shown in FIG. 13.

Figure 1A:
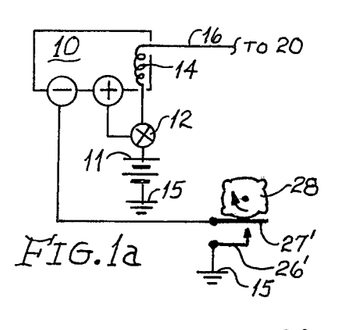
FIG. 1a is a partial schematic diagram of FIG. 1 wherein the AC power applied to the ignition transformer is delayed.

Referring to FIG. 1a, the system shown is identical to that of FIG. 1, except that cam 28 has an additional pair of contactors 26'–27' in cooperation with cam 28 (or an additional light emitting switch or additional magnetic pulse switch). Contactor 26' is connected to ground and contactor 27' is connected to the negative terminal of AC power unit 10. When contactors 26–27 have been opened to start the Kettering transient in primary winding 21 and output winding 14, contactors 26'–27' are still in open mode for a predetermined angle of cam 28 rotation, delaying the energizing of power unit 10 by DC power. When cam 28 is rotated to that predetermined angle so its high portion is in cooperation with contactor 27', contactors 26'–27' are closed and DC power is delivered to unit 10 to energize same during such closed mode, thus providing delayed AC power to primary winding 21. The delay in AC power will enable modulation of the AC power with the large excursion portion of the Kettering transient at arc initiation time to provide an extremely high power level of modulated input to primary winding 21 and hence to secondary 22 and to the igniters.

Figure 2:
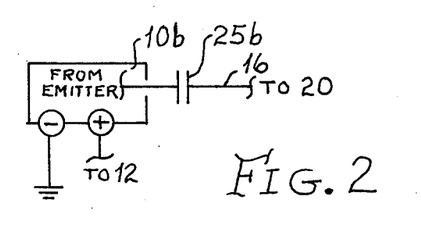
FIG. 2 is a partial schematic diagram substituting a different AC power source in the system of FIG. 1.

Referring to FIG. 2, the circuit here is substantially the same as in FIG. 1, except that source 10 is substituted by source 10b and an additional capacitor 25b is provided to couple the output from a high power multivibrator, usually at one of the emitters of the transistors thereof to ignition transformer 20 via wire 16. Capacitor 25b value as well as capacitor 25 value will have to be determined as hereinabove described. The results obtained are similar to those of FIG. 1, wherein primary winding 21 constitutes the non-linear element enabling intermodulation of the Kettering waveform with signals from source 10b.

Figure 3:
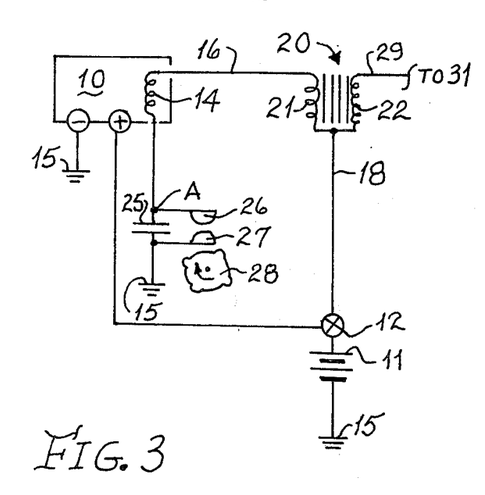
FIG. 3 is a schematic diagram of the substantially same system as in FIG. 1 with switching means in a different portion of the circuit.
Figure 13:
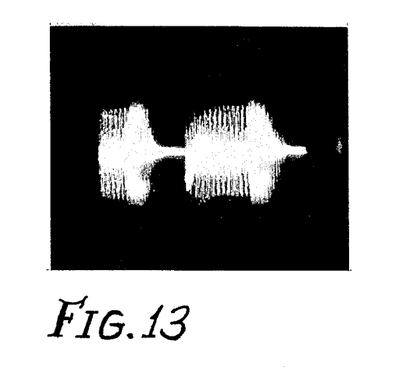
FIG. 13 is a photograph taken from the face of an oscilloscope of the voltage across the transformer primary winding during igniter firing when the Kettering system is additionally fed with a square wave power source modulating the transient voltage produced by the Kettering system and showing the intermodulation pattern thereof.

Referring to FIG. 3, the circuit shown is functionally identical to that of FIG. 1, except that winding 14 is connected by wire 16 feeding the non-common terminal of primary winding 21 of transformer 20, the common terminal being connected by wire 18 to ignition switch 12. The other side of output winding 14 is connected at A to contactor 27 and to one side of capacitor 25, and contactor 27 is also at ground potential. Otherwise, the system operates as described in discussion of FIG. 1 and functionally operates as shown in FIGS. 11–13.

Figure 4:
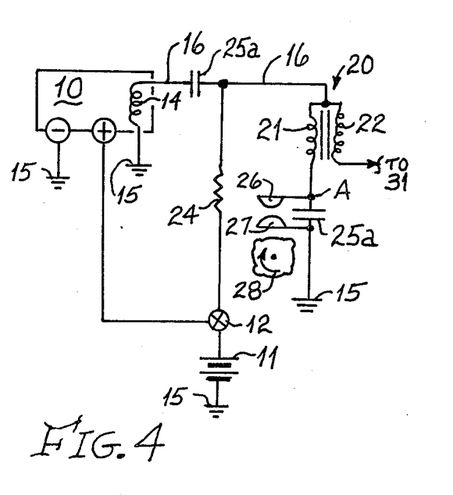
FIG. 4 constitutes a slight variation of the system of FIG. 1.

Referring to FIG. 4, the circuit therein is functionally similar to that discussed in connection with FIGS. 1, and 11–13. The structural differences involve a first capacitor 25a in series with an output terminal of winding 14 in line 16, and a resistor 24 connected between the junction of the first capacitor 25a and the common terminal of transformer 20 and ignition switch 12. A second capacitor 25a used in series with primary winding 21 and ground has the same value as the first capacitor, and each capacitor 25a will be doubled the value of capacitor 25 as used in FIG. 1.

Figure 5:
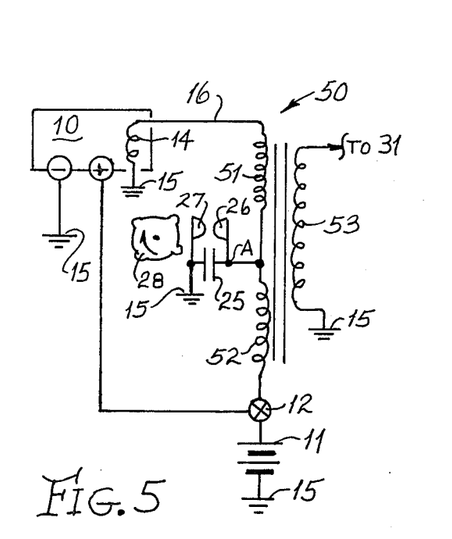
FIG. 5 is a schematic diagram of a system similar to that of FIG. 1 except that it employs a transformer with two primary windings.

Referring to FIG. 5, the functions performed are similar to those discussed in connection with FIG. 1 and shown in FIGS. 11–13. The structure is similar to that of FIG. 1 except that transformer 50 is substituted for transformer 20. Transformer 50 has two primary windings 51 and 52 and a secondary high voltage winding 53. Primary winding 51 therefore additionally has a common junction with primary winding 52 at A. The other side of primary winding 52 is connected to ignition switch 12. Therefore, in essence the AC source at 10 has its independent primary winding 51 while the Kettering portion has its own primary winding 52. The common junction at A feeds the combination of contactors 26–27 and capacitor 25 as discussed in connection with FIG. 1, so that here too capacitor 25 is common to the Kettering portion of the system and the AC feed portion thereof, and in operation identical with the system described in FIG. 1, to feed high oltage and power modulated waveform by secondary 53 to distributor rotor 31.

Figure 6:
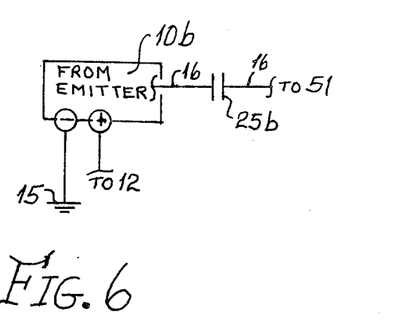
FIG. 6 is a system substantially identical to that of FIG. 5 except that the AC power unit used is slightly different.

Referring to FIG. 6, the system herein is substantially identical to that of FIG. 5, and functions as stated in connection with FIGS. 1 and 11–13 apply, except that AC power source 10 is substituted by source 10b and capacitor 25b, already discussed in connection with FIG. 2.

Figure 7:
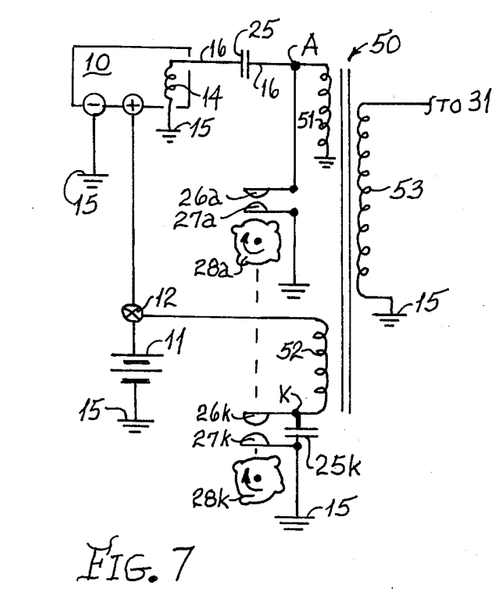
FIG. 7 is a system schematic similar in principle to that of FIG. 5.

Referring to FIG. 7, the system is substantially similar to that of FIG. 5 except that both the AC portion and the Kettering portion have independent pairs of contactors 26a–27a and 26k–27k respectively. The AC portion has capacitor 25 providing its impedance matching function in circuit with primary winding 51, contactor 26a being connected at A to one side of winding 51 and contactor 27a being connected to ground, so that upon rotation of cam 28a, winding 51 is periodically short-circuited when the high portion of cam 28a closes contactors 26a–27a inhibiting delivery of AC power to transformer 50. At the same time, winding 52 is fed DC power through ignition switch 12, the other side of winding 52 being connected in conventional Kettering circuit to contactors 26k–27k across capacitor 25k. Another cam 28k is shown to close periodically contactors 26k–27k for charging winding 52, for simplicity of understanding the circuit. However, only cam 28a is needed to activate both pairs of contactors 26a–27a and 26k–27k simultaneously by spacing two pairs of contactors say 180° from each other so that opposite high portions of cam 28a will activate both contactor pairs simultaneously. It can therefore be seen that winding 51 will be short circuited when winding 52 is being charged, so that no energy is transferred to winding 53 at that time. But after the dwell period, contactor pairs 26a–27a and 26k–27k open simultaneously to deliver AC to winding 51 and a Ketering waveform to winding 52 to intermodulate same by the non-linear characteristics of transformer 50, and functionally resulting in performance discussed in connection with FIGS. 1 and 11–13. It should be noted that in this circuit, capacitor 25 obeys the criteria for its selection as discussed in connection with FIG. 1, and that capacitor 25k may be any capacitor normally used in a Kettering type system.

Figure 8:
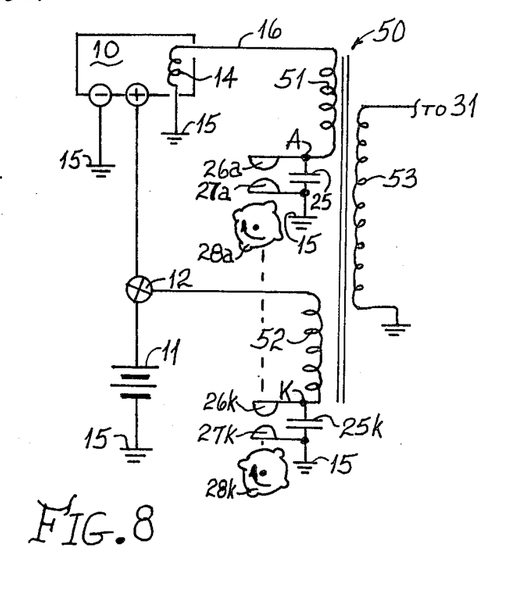
FIG. 8 is a system schematic similar in princile to that of FIG. 7.

Referring to FIG. 8, the system herein is structurally similar to that of FIG. 7 and functionally identical. The structural differences involve capacitor 25 being aperiodically short circuited by contactor pair 26a–27a instead of short circuiting winding 51. Here too, cam 28k is shown for ease of understanding, and contactor pair 26k–27k may be operated by the same cam, namely cam 28a as discussed in conjunction with FIG. 7. The functional performance is the same as discussed in connection with FIGS. 1 and 11–13.

Figure 9:
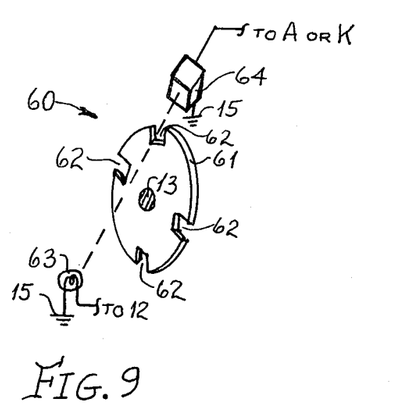
FIG. 9 shows in schematic form a light emitting diode switch that may be used in any of the circuits of FIGS. 1-8.

Referring to FIG. 9, a light emitting diode sensor-switch, sometimes referred to as infra-red switching circuit, and well known in the ignition art, is shown at 60. Such switch may be used in the structures of FIGS. 1–8 instead of the contactors and cams shown therein. This circuit enables switching without the use of contactors. A light or light emitting diode source 63 is connected between ground an ignition switch 12 to provide a beam of light directed to pass through slots 62 in disk 61 driven by shaft 13. The light impinges on optical sensor 64 which sensor provides an open circuit between the sensor 64 output and either point A or K of the particular system to which such output is connected, and is equivalent in function to opening the contactors shown in FIGS. 1–8. The circuit within member 64 is closed during periods when disk 61 inhibits the passing of light so that the Kettering portion of the systems of FIGS. 1–8 can be charged, and output from the AC source inhibited during this mode.

Figure 10:
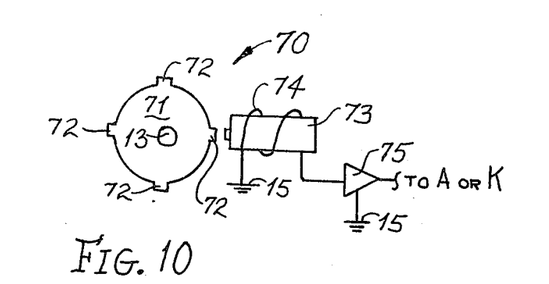
FIG. 10 shows in schematic form a magnetic pulse switch usable in any of the circuits of FIGS. 1-8.

Referring to FIG. 10, a magnetic pulse unit 70 which is known in the ignition art, may be used in the same way as the light emitting diode unit 60 of FIG. 9. Here, wheel 71 is of magnetic material and is driven by means of shaft 13 so that when high portions 72 thereof pass the pole face of permanently magnetized core 73, a pulse is magnetically generated in winding 74. Signal output of winding 74 is fed to signal conditioner-amplifier 75 to provide an output to either points A or K of FIGS. 1-8, instead of the contactors and cam which are eliminated. Operation of this system is well known in the art and its use in the inventive circuits, as well as the use of the switch of FIG. 9, would be obvious and need not be further discussed.

Figure 14:
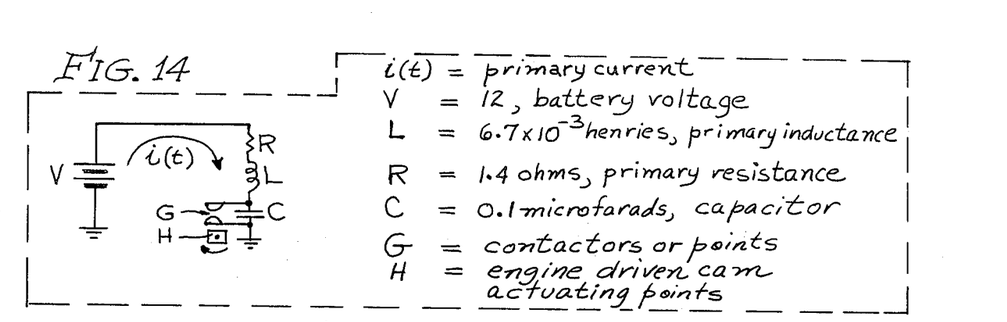
FIG. 14 is an equivalent circuit schematic for computing the Kettering transient current through the ignition transformer primary and for computing the voltage induced in such primary. This equivalent circuit may be used to approximate the behavior of the circuits comprising FIGS. 1, 1a and 3. The letter designations herein substitute for the numbered components of the other figures for convenience of computation.
Figure 15:
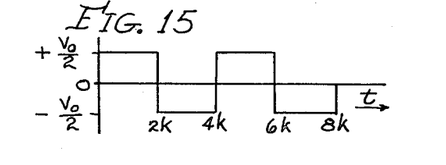
FIG. 15 is a waveform of the voltage produced by the rectangular wave generator shown in the various figures herein.

Referring to FIGS. 11-16, such figures embody an equivalent circuit in FIG. 14, representing the circuits of FIGS. 1, 1a or 3, used for mathematical computations to obtain the Kettering transient voltage component, which is one of the voltage components used in the inventive system. FIG. 15 shows the rectangular waveform of the voltage output generated across inductor 14 of rectangular waveform generator 10 as shown in FIGS. 1, 1a, 3, 4, 5, 7 and 8. FIG. 11 shows the approximate graph of the Kettering voltage component, and it should be remembered that such Kettering component will intermodulate with the waveform of FIG. 15 in primary winding 21 of the ignition transformer.

In FIG. 14, L is the symbolic notation for primary winding 21, R is the resistance of winding L, C is the symbolic notation for capacitor 25, G is the symbolic notation of contactor pair 26-27, H is the symbolic notation for cam 28, and V is the symbolic notation for the DC voltage provided by battery 11.

In FIG. 15, the waveform therein shows $V_o$ as being the peak-to-peak amplitude of the voltage output of source 10, and having a cycle period of 4k seconds. This means that for a repetition rate of $2.5 \times 10^3$ hertz, a full wave or cycle of such repetition rate will be 4k seconds = $4 \times 10^{-5}$ seconds. Therefore k will be a quarter of a cycle or $10^{-5}$ seconds of duration.

Figure 16:
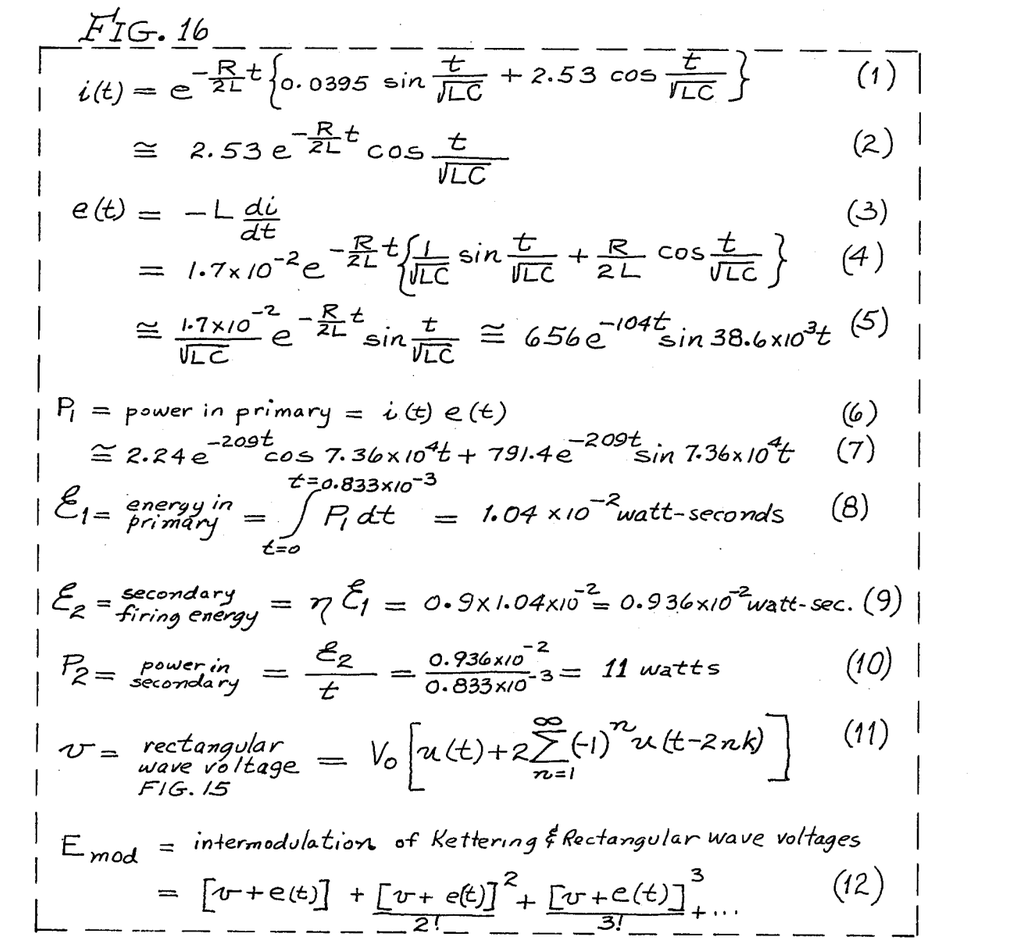
FIG. 16 constitutes a group of mathematical expressions showing the computed performance of the ignition system in accordance with the equivalent circuit of FIG. 14.

In FIG. 16, the Kettering voltage is shown by expressions (3)-(5) and such voltage is approximated by the graph of FIG. 11. In such FIG. 16, for example, the expression for the rectangular waveform voltage v, as seen in FIG. 15, is shown by expression (11), which expression states such voltage in the time domain utilizing the peak amplitude of such voltage of $V_o$ and the conventional mathematical statements for unit step functions of u(t) and summation of such unit step functions that have a time delay in them of u(t−2nk), which enables the statement in (11) to be handled mathematically. The voltage expression of (11) may be found in any good textbook dealing with transient phenomena or the Laplace transform.

Hence, a comparison of the graphed Kettering waveform voltage may be made with the actual Kettering voltage obtained as shown photographically in FIG. 12. The oscilloscopic pattern of FIG. 12 was obtained by simply short circuiting temporarily winding 14 of source 10, and recording the results on the oscilloscope when such oscilloscope was connected across winding 14.

Expression (12) in FIG. 16 is the relationship for amplitude modulation of the Kettering voltage with the voltage shown in FIG. 15, wherein e(t) is the Kettering voltage and v is the voltage of FIG. 15. The mathematical expressions resulting from such modulated voltages $E_{mod}$ are too difficult to develop. But no mathematical expansion of expression (12) is needed when the actual modulation of these two voltages is shown in the oscilloscopic pattern of FIG. 13. Comparison of FIG. 13 with FIG. 12 clearly shows that the Kettering voltage intermodulated with the rectangular wave output voltage of source 10 is more advantageous in order to obtain greater quantities of igniter firing energy than utilizing the Kettering voltage by itself, since the combined or intermodulated voltages as in FIG. 13 lasted for the entire firing period duration, whereas the Kettering voltage by itself lasted only a fraction of the firing period, as seen in FIG. 12.

Hence, as indicated in equation (2) the maximum primary current in winding 21 due to the Kettering transient alone will be about 2.54 amperes, and as seen by graphed FIG. 11 the Kettering voltage will have a maximum swing between −285 and +265 volts for a total swing of 550 volts maximum. With a turns ratio of transformer 20 of 100, the induced voltage in primary 21 of 550 volts due to the Kettering voltage component alone would yield about 50,000 volts across secondary winding 22. It goes without saying, that adding the voltage due to the output from source 10, as in FIG. 15, to the Kettering voltage will produce even a higher voltage across secondary 22. Such voltage output across secondary 22 will overcome internal engine pressures during the gas compression cycle and fire across igniter electrodes which are spaced about 0.250 inches apart or greater.

It should be evident that the Kettering waveform thus developed, also shown in FIG. 12 including subsequent ringing cycles, that when combined with the AC output also fed into the ignition transformer, the nonlinear characteristics of the transformer will cause intermodulation between the Kettering and AC waves, and result in increased energy and greater duration of firing as well as higher voltage due to such intermodulation products, as shown in FIG. 13. The test confirmation of the above can be clearly seen in oscillographic patterns depicted in FIGS. 12 and 13, and shows that a a high power ignition system is possible without the use of excessively and inordinately high secondary voltages, which when joined with higher currents may be dangerous to handle in such typical consumer product line as an automobile.

It may be seen from FIG. 13 that the most effective portion of the modulation envelope occurs when the AC output is coincidental with the Kettering transient waveform, and that preceding in time to such coincidence only some modulation is possible. Hence, it might be desirable to provide a delay circuit (not shown) at the AC output terminals to cause delay of the AC voltage output so as to provide phase envelope coincidence of the AC voltage and the Kettering transient waves. Such may be accomplished also in FIGS. 7-8 for example, since two independent switching mechanisms are used so that the AC switching portions, as for example 26a-27a and 28a (as well as the equivalent light emitting diode switches or the magnetic pulse switches), to create such time delay and provide AC and Kettering envelope coincidence by virtue of contactors 26a-27a being arranged to open later than contactors 26k-27k. Such required time delay may also be provided by utilizing a predetermined length of transmission cable to connect the output of the AC unit to the input of the ignition transformer. Also, such delay can be provided by the use of a single cam 28 operating contactor pairs 26a-27a and 26k-27k where opening of contactors 26a-27a is delayed by positioning the contactors with respect to the high portion of the cam so that contactors 26a-27a remain closed a predetermined lag period after contactors 26k-27k have opened.

Thus for example in an eight cylinder engine, contactors 26k-27k are adjusted to have a 30° distributor dwell period, the firing period occurs over a 15° span wherein the major transient portion will occur about two-thirds of the firing period or at 40° of the total distributor dwell and firing periods. Hence if contactors 26a-27a are adjusted to have a dwell period of 40°, the major portion of the Kettering transient would coincide with the AC waveform at arc initiation time, and maximum power would be provided at that time to the igniters.

Referring to FIGS. 14, 15 and 16, wherein the equivalent circuit for configurations of FIGS. 1, 1a and 3 may be represented in symbolic terminology, is depicted by FIG. 14, for the purpose of computing Kettering type circuit transients occurring in the system, as shown in oscilloscopic waveform of FIG. 12. Such equivalent circuit may be used to readily handle Laplace transform relationships in order to solve for the current in the ignition transformer primary winding.

The resultant Kettering transient current and voltage expressions are derived wherein the current in the primary is shown by equation (1) and its approximate solution by equation (2).

Utilizing Faraday's law of induction, as stated in expression (3), the induced Kettering transient voltage in the ignition transformer primary is stated by equation (4) and its approximate solution, using the parameter values shown in FIG. 14, is stated by equation (5). When equation (5) is graphically solved for various periods of time, considering only the major voltage swings, FIG. 11 graph as well as the more accurate photographic oscilloscope pattern of FIG. 12 shows such Kettering voltage excursions.

The power in the ignition transformer primary is then computed as a product of voltage and current at expression (6), and shown in its detailed format by expression (7), which expression (7) is integrated over the firing period of an igniter of 0.833 milliseconds, which is the firing time selected for these computations based on a speed of 6000 rpm of an 8 cylinder engine, to obtain the electrical energy in the primary winding of the ignition transformer of $1.04 \times 10^{-2}$ watt-seconds, as shown in (8).

The electrical energy in the secondary winding used to fire the igniter will then be shown by expression (9) which is simply the product of the primary energy and the transfer efficiency of the transformer. A transfer efficiency of $\eta = 0.9$ is a realistic figure for such transformer, resulting therefore in an energy level of $0.936 \times 10^{-2}$ watt-seconds, delivered to the igniter to fire it.

The instantaneous power in watts delivered to the igniter is obtained by dividing the secondary winding energy by the firing period, which shows about 11 watts of Kettering transient power, shown at (10).

The foregoing discussion dealt with only the Kettering transient component. However, additionally it must be remembered that the inventive system employs a method for intermodulating such Kettering transient with an AC rectangular wave. The voltage across the primary winding of the intermodulated wave is quite accurately depicted by the oscilloscopic pattern of FIG. 13 where each wave group therein represents the firing of one igniter. It can therefore be appreciated that there is a substantial increase in the intermodulated wave over the Kettering wave of FIG. 12, in view of the increase in the area of the pattern of FIG. 13 over the area of the pattern of FIG. 12.

The relationship of intermodulation is much too complex for computation herein. Exemplary of the complex expression that would result would be an examination of the expression for the voltage of the rectangular wave of FIG. 15 as stated in equation (11).

The intermodulation of the Kettering voltage e(t) and the rectangular wave voltage v, may therefore be expressed as $E_{mod}$ at (12), representing an infinite converging series that is conventionally used to express amplitude modulation occurring between two waves. Expansion of such series is both difficult and unnecessary inasmuch as the oscilloscopic pattern of FIG. 13 accurately depicts the intermodulation of such voltages.

An approximate ratio of power or energy delivered by the inventive system with respect to a system employing only a Kettering circuit, can be determined by comparing the areas of an individual envelope from FIG. 13 and from FIG. 12. It appears as if the envelope of FIG. 13 has about 10 times the area of the envelope of FIG. 12, and since both power and energy are functions of the square of the voltage or current, for the same impedance which we can approximate as equal, then the energy or power of the modulation system would be in the order of 100 times as great as that of a Kettering system.

What is claimed is:
1. An ignition system, comprising the combination of:
    first means, intermittently fed by DC power, for producing transient power during operative mode of the system, said first means including an ignition transformer having a primary winding and a capacitor intermittently in series with the primary winding; and
    second means, in series circuit with the first means, for providing alternating current power to intermodulate with the transient power in the first means during said operative mode, said second means including an alternating current power source coupled to said capacitor, wherein said power source is duty cycled.

2. The invention as stated in claim 1, including means, connected to said capacitor, for intermittently shunting and unshunting said capacitor.

3. The invention as stated in claim 1, including switching means, connected across the capacitor, for intermittently shunting and unshunting the capacitor.

4. The invention as stated in claim 1, wherein said transformer has a plural number of primary windings.

5. The invention as stated in claim 1, including switching means, connected to the transformer, for intermittently short circuiting said transformer.

6. The invention as stated in claim 1, including switching means, connected to the power source, for providing time delay in energizing said power source and consequently in providing delayed output therefrom with respect to the transient power.

7. The invention as stated in claim 1:
    said second means including means for delaying the AC power in relation to the transient power.

8. The invention as stated in claim 1, including means, connected to the second means, for duty cycling said second means.

9. The invention as stated in claim 1, including switching means, coupled to said power source, for enabling said power source to be keyed on and off during said operative mode.

* * * * *